US00RE39441E

(19) United States
(12) Reissued Patent
Wotton et al.

(10) Patent Number: US RE39,441 E
(45) Date of Reissued Patent: Dec. 26, 2006

(54) PRINTER WITH VACUUM PLATEN HAVING BIMETALLIC VALVE SHEET PROVIDING SELECTABLE ACTIVE AREA

(75) Inventors: Geoff Wotton, Battleground, WA (US); Robert M. Yraceburu, Camas, WA (US); Steven B. Elgee, Portland, OR (US)

(73) Assignee: Hewlett-Packard Development Company, L.P., Houston, TX (US)

(21) Appl. No.: 10/771,262

(22) Filed: Feb. 3, 2004

Related U.S. Patent Documents

Reissue of:
(64) Patent No.: 6,571,702
Issued: Jun. 3, 2003
Appl. No.: 09/726,964
Filed: Nov. 29, 2000

(51) Int. Cl.
*B41F 13/24* (2006.01)

(52) U.S. Cl. ..... 101/232; 271/183; 355/76
(58) Field of Classification Search ..... 101/232, 101/233; 400/648; 271/183, 276; 355/73, 355/76
See application file for complete search history.

(56) References Cited

U.S. PATENT DOCUMENTS 3,527,166 A * 9/1970 Jaffa et al. ..... 101/474
3,754,751 A * 8/1973 Capetti et al. ..... 271/103
4,792,249 A * 12/1988 Lahr ..... 400/578
4,819,928 A * 4/1989 Osborn et al. ..... 271/276
5,414,491 A * 5/1995 Bryant ..... 355/73
6,154,240 A * 11/2000 Hickman ..... 347/104
6,172,741 B1 * 1/2001 Wotton et al. ..... 355/73
6,254,090 B1 * 7/2001 Rhodes et al. ..... 271/276
6,270,074 B1 * 8/2001 Rasmussen et al. ..... 271/276

FOREIGN PATENT DOCUMENTS

DE 10002094 * 10/2000
JP 63022675 * 1/1988
JP 9058897 * 3/1997
JP 2000318870 * 11/2000
WO WO09911551 * 3/1999

OTHER PUBLICATIONS

United Kingdom Search Report, Apr. 30, 2002.*

* cited by examiner

*Primary Examiner*—Ren Yan

(57) ABSTRACT

A printer has a media transport with a rigid, air-transmissive platen. A movable air-transmissive flexible web overlays the platen. A suction device communicates with the platen to draw air through the web and through the platen such that a sheet of media carried on the web is biased toward the platen. A valve sheet overlays or underlies the platen, and includes a plurality of shut-off elements, each movable in response to temperature changes between a closed position in which the element contacts a portion of the platen to prevent air flow through that portion of the platen, and an open position, in which the element is spaced apart from the platen to admit air to the platen portion. The shut off elements may include resistive heaters and bimetallic strips so that application of electricity generates heat to flex the strip to an open position.

20 Claims, 4 Drawing Sheets

PRINTER WITH VACUUM PLATEN HAVING BIMETALLIC VALVE SHEET PROVIDING SELECTABLE ACTIVE AREA

Matter enclosed in heavy brackets [ ] appears in the original patent but forms no part of this reissue specification; matter printed in italics indicates the additions made by reissue.

FIELD OF THE INVENTION

This invention relates to computer printers, and particularly to media transport mechanisms and vacuum hold-down devices.

BACKGROUND AND SUMMARY OF THE INVENTION

Some approaches for thermal inkjet printing use a vacuum platen as part of the media transport. Essentially, a sheet of media to be printed is carried on an air-transmissive belt over a flat plate that contains a multitude of apertures. A vacuum device below the plate draws air into the apertures, creating a pressure differential that flattens the media sheet against the plate, with the web sliding over the plate to feed the sheet past a printing device. The printing device may be a thermal ink jet pen that reciprocates over the sheet in a scan direction perpendicular to the feed direction, and which lays down successive swaths of ink droplets to generate a printed image.

The platen may be heated to facilitate rapid drying of aqueous ink, and the vacuum effect holds the sheet in a flat stable position as the ink dries. This avoids curling or "cockle" effects that can distort the media surface in areas where large quantities of ink are imprinted, due to the dimensional effect of moisture on paper and other media. When the media is held flat during the drying process, a flat result is generated.

While effective for many applications, vacuum platen have certain limitations. First, smaller media that does not cover most of the platen area leave substantial platen areas open. This permits air to be drawn into the area below the platen, bypassing the sheet, and thereby requiring substantial airflow capacity to maintain adequate relative pressure on the sheet. For a minimally sized sheet, nearly the entire area of the platen may be open to airflow. This requires a large vacuum blower, with attendant problems of size, power consumption, and noise. Further, for the platen to be maintained at an elevated temperature needed for ink drying, increased heating power is needed to offset the cooling effect of ambient air flowing through the platen. Also, open areas surrounding a small media sheet may still have depressed temperatures compared to covered regions, and subsequent large media may encounter non-uniform platen temperatures that may impair printing results. In addition, temperature gradients may occur near media edges, leading to non-uniform drying.

An additional concern even for platens optimized for a particular media width is that unless a continuous end-to-end stream of media is passed over the platen, there will be large open areas of the platen ahead of the leading edge of the first sheet, and following the training edge of the last sheet. This generates similar disadvantages to those discussed above regarding media width.

The present invention overcomes the limitations of the prior art by providing a printer having a media transport with a rigid, air-transmissive platen. A movable air-transmissive flexible web overlays the platen. A suction device communicates with the platen to draw air through the web and through the platen such that a sheet of media carried on the web is biased toward the platen. A valve sheet overlays or underlies the platen, and includes a plurality of shut-off elements, each movable in response to temperature changes between a closed position in which the element contacts a portion of the platen to prevent air flow through that portion of the platen, and an open position, in which the element is spaced apart from the platen to admit air to the platen portion. The shut off elements may include resistive heaters and bimetallic strips, so that application of electricity generates heat to flex the strip to an open position.

DETAILED DESCRIPTION OF A PREFERRED EMBODIMENT

Figure 1:
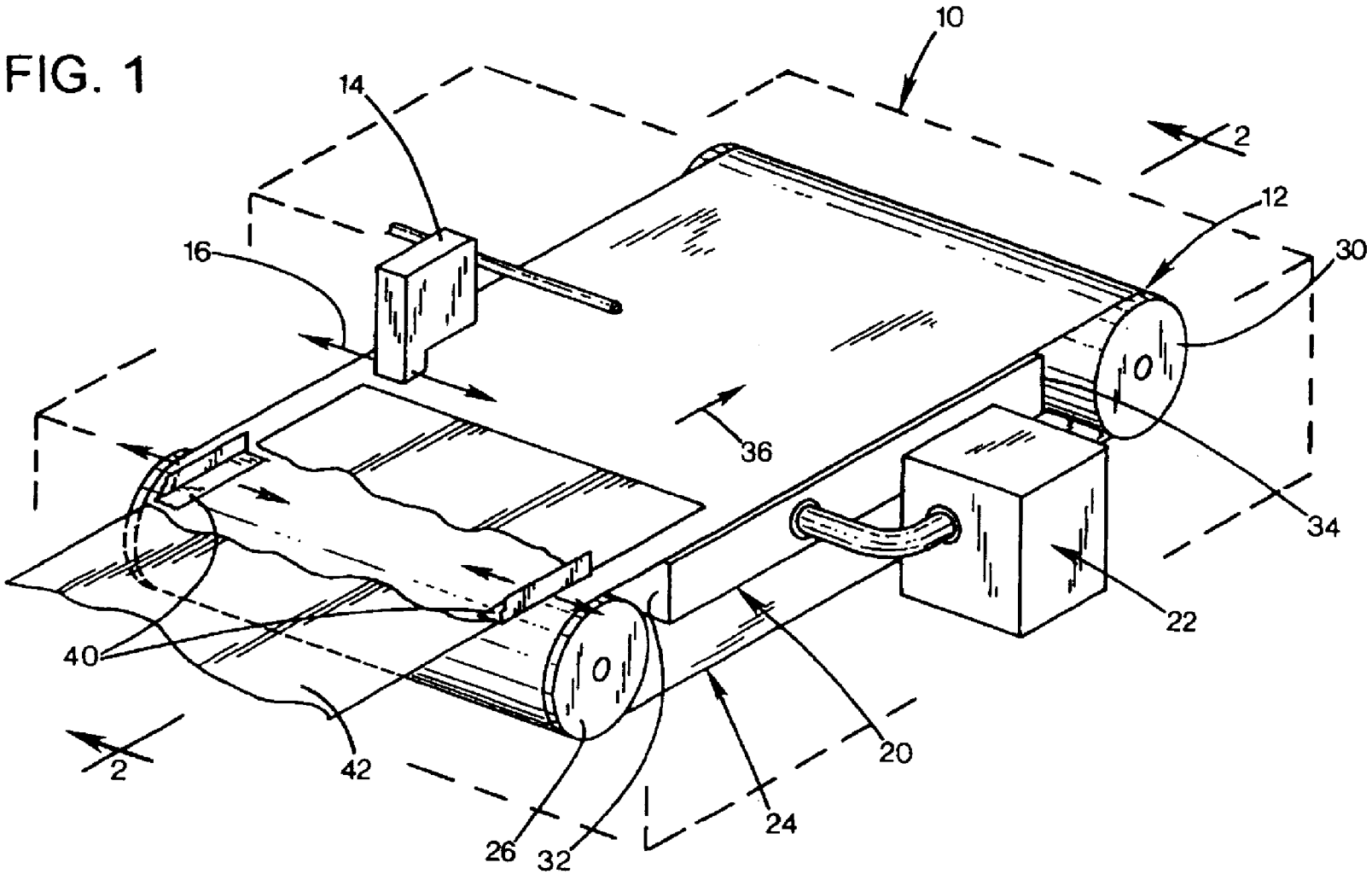
FIG. 1 is a perspective view of a printer and media transport mechanism according to a preferred embodiment of the invention.

FIG. 1 shows an ink jet printer 10 having a media transport mechanism 12 over which an ink jet pen 14 reciprocates along a scan axis 16. The transport mechanism includes a platen assembly 20 having a flat upper surface. A vacuum blower 22 is connected to the platen device to draw air into the upper surface of the platen as will be discussed below. The blower may be specified as a centrifugal blower capable of 10-inch water column and a flow rate depending on platen size. A media transport belt 24 encompasses the platen, and is lastly supported by opposed belt rollers 26, 30, one at an inlet edge 32 of the platen, and one at an outlet edge 34 of the platen. The uppermost surfaces of the rollers occupy a common plane with the upper surfaces of the platen assembly, so that the upper web of the belt rests at the platen's upper surface.

The belt is an air-transmissive mesh screen, or may be any perforated or porous sheet having a low air flow resistance, small thickness, and flexibility. The outlet end roller 30 is motorized to drive the belt in a feed direction 36, which defines the feed axis perpendicular to the scan axis 16. The movement of the belt is controlled by control circuitry (not shown) that also controls the pen scanning, ink droplet expulsion, and all other operations of the printer to provide coordinated action. A pair of paper guides 40 upstream of the inlet end of the media transport adjust in concert to the width of a media sheet 42, centering the sheet within a media supply tray (not shown) on a midline of the platen parallel to the feed axis, and preventing skewing of the sheet. The guides may include sensors that feed back the guide positions to the controller so that the controller may establish other printer functions based on the inferred media width.

Figure 2:
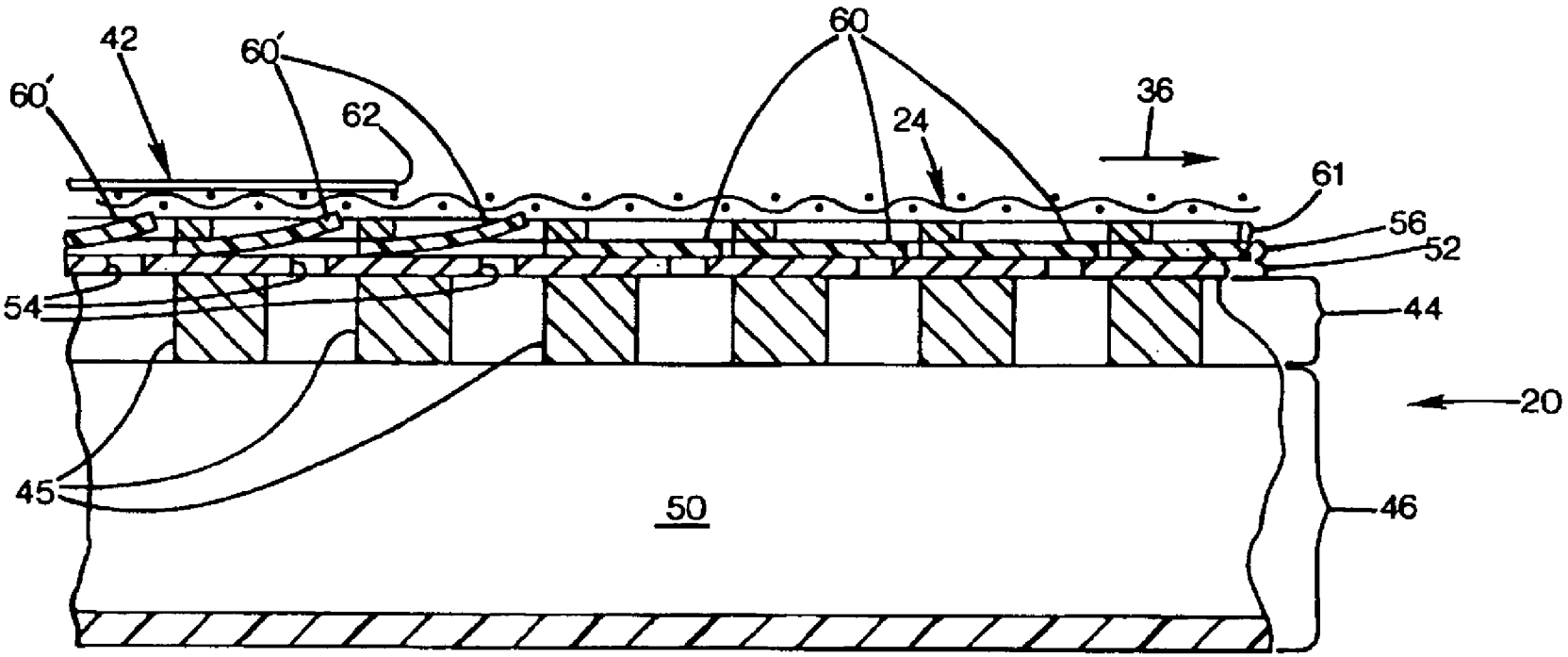
FIG. 2 is an enlarged sectional side view of a platen taken along line 2—2 of FIG. 1.

FIG. 2 shows an enlarged sectional view of the platen assembly 20. A rigid plate 44 provides structure for the platen surface, and is perforated with a multitude of holes 45. The plate thickness is preferably about 12 mm, the hole diameter about 3 mm, and the hole center-to-center spacing about 6 mm in each direction, although these may vary widely in different applications. Below the plate is a box 46 that defines a plenum 50 having a height substantially greater that the plate hole diameters, so that the pressure in the plenum is substantially uniform.

An airflow limiting sheet 52 overlays the upper surface of the plate, and defines a multitude of apertures 54, each registered with and centered on a respective plate hole 45. The apertures have a limited diameter less than that of the plate holes 45, so that the pressure drop during air flow is greatest across the apertures. The apertures are sized in conjunction with the capacity of the blower to generate a required flow rate at a pressure differential of at least a 10 inch water column between the plenum and ambient to ensure the media sheet is secured adequately against the platen.

In the preferred embodiments, the sheet thickness is preferably about 0.25 mm, and the aperture diameter about 0.6 mm, although these may vary widely in different applications. An active valve sheet 56 overlays the airflow limiting sheet 52, and includes movable flaps 60 that are registered each with a respective aperture. The flaps are movable between a closed position as illustrated by flaps 60, in which the flaps remain coplanar with the valve sheet 56 and fully overlay and obscure the respective apertures 54 to prevent downward airflow, and an open position 60' in which the free ends of the flaps rise upward from the plane as the flaps flex in response to energizing of an air flow control mechanism discussed below. In an alternative embodiment, the valve sheet may be below the plate 44. However, with the sheet above the plate, the air pressure differential advantageously assists in scaling off closed valve elements.

Overlaying the valve sheet is an upper heater layer 61 with a heater element network (not shown) in the form of resistive traces on the surface of the plate, which generate an output of 10–20 mW per square mm. Alternative heating methods may be employed. The heater covers the entire plate, and has apertures over the valve apertures to avoid limiting air flow, and to avoid interfering with flexure of the valve elements. The heater layer preferably includes a lower portion of a thermally insulating material to minimize heat transfer from the heater to the valve sheet.

The belt 24 overlays the heater layer, and moves across the heater sheet surface in the feed direction 36. The feed direction coincides with the direction in which the valve flaps extend, so that the belt slides smoothly over elevated arms without snagging and damaging arms, and to minimize friction. The belt rests on the heater sheet without a gap, and with minimal force, except as generated by vacuum forces on the media sheet. As shown, the media sheet has a leading edge 62 that is shown positioned over a region in which the flaps are elevated to the open position 60'. By maintaining flaps in the open position underneath all portions of the sheet the entire sheet is flattened against the platen. Some marginal open valves beyond the sheet edges on all sides are tolerated, with the blower having adequate capacity to maintain the needed partial vacuum in the plenum even when these areas are open. With a blower rated at 40 cubic feet per minute, an open area of 70 square inches is tolerated while maintaining the needed pressure differential. This is significantly less than the typical area of the entire platen, necessitating the closing of many or most of the valves where the platen is not covered by the media sheet, to allow the use of a practical and economical use of a limited capacity blower, with attendant advantages in size, power consumption, and quietness.

Figure 3:
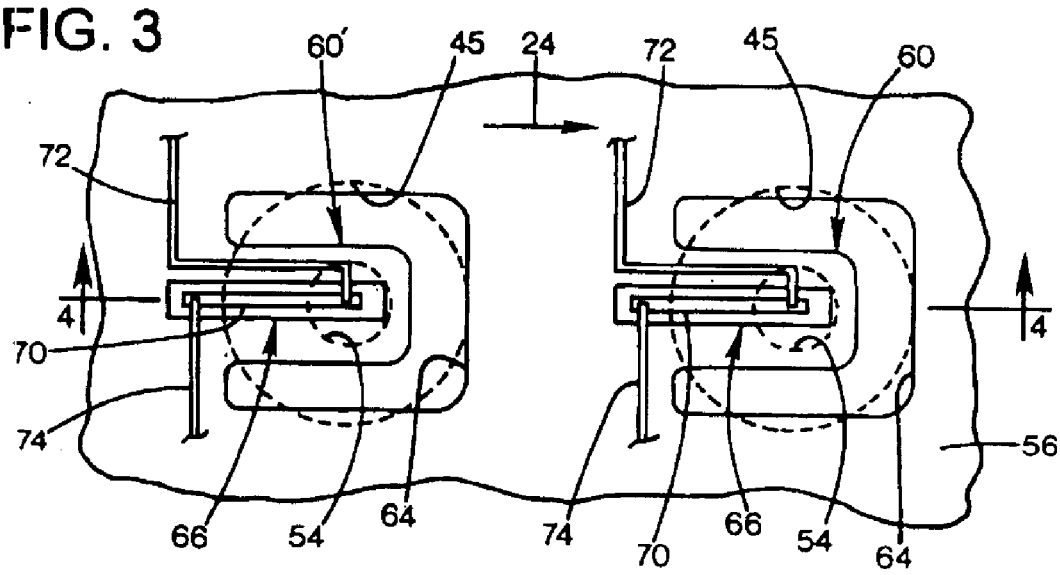
FIG. 3 is an enlarged plan view of the platen of FIG. 1.
Figure 4:
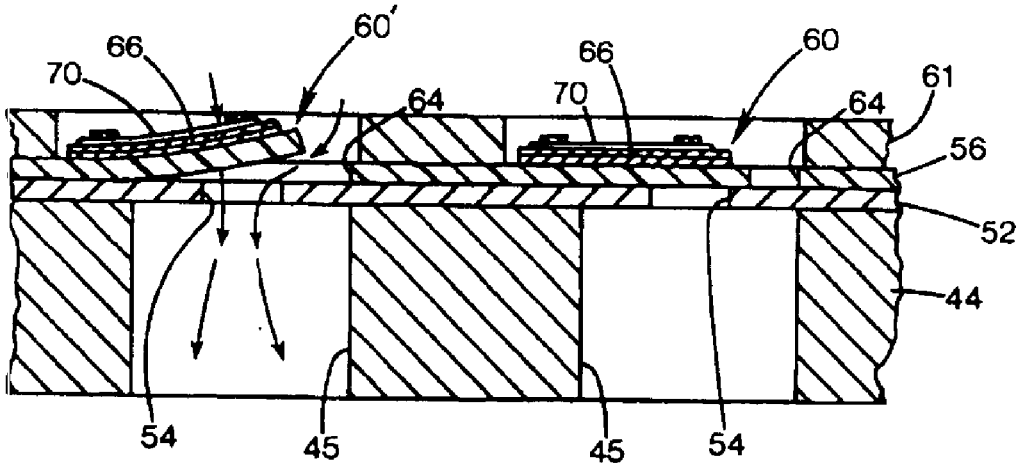
FIG. 4 is an enlarged sectional side view of a platen taken along line 4—4 of FIG. 3.

FIG. 3 is a plan view of the valve sheet. Each valve element includes a U-shaped aperture 64 that surrounds the flap 60, 60' on three sides. The flap fully covers the flow restricting sheet aperture 54, so that when the flap is in the lowered position, the aperture is sealed. The aperture has a diameter of 0.25 mm, and the flap has a width of 2 mm, and a length of 3 mm. Each flap includes an elongated bimetallic strip 66 overlaying the flap, extending from a position beyond the root of the flap to near the free end of the flap. By extending beyond the base or root of the flap, a portion of the strip is well secured in the place of the valve sheet, so that flexing of the strip tends to primarily lift the free end of the flap, as shown in FIG. 4. The strip is preferably selected to remain flat at temperatures below a selected threshold of about 100–150° C., which is the maximum temperature set-point of the platen, and to flex at higher temperatures. Suitable strips may be formed of standard bimetallic materials, with dimensions of 1.5 mm by 8 mm.

As shown in FIGS. 3 and 4, a thin film resistor 70 is applied to substantially the entire length of the strip. A suitable resistance valve is in the range of 1000–1,000,000. A conductive trace 72 connects to the end of the resistor at the free end of the flap, and a trace 74 connects to the opposite end of the resistor. The traces are interconnected to switchable power source to selectively apply a voltage to the resistors, generating adequate heat to raise the bimetallic strip above the temperature threshold, opening the valve element to air flow.

Figure 5:
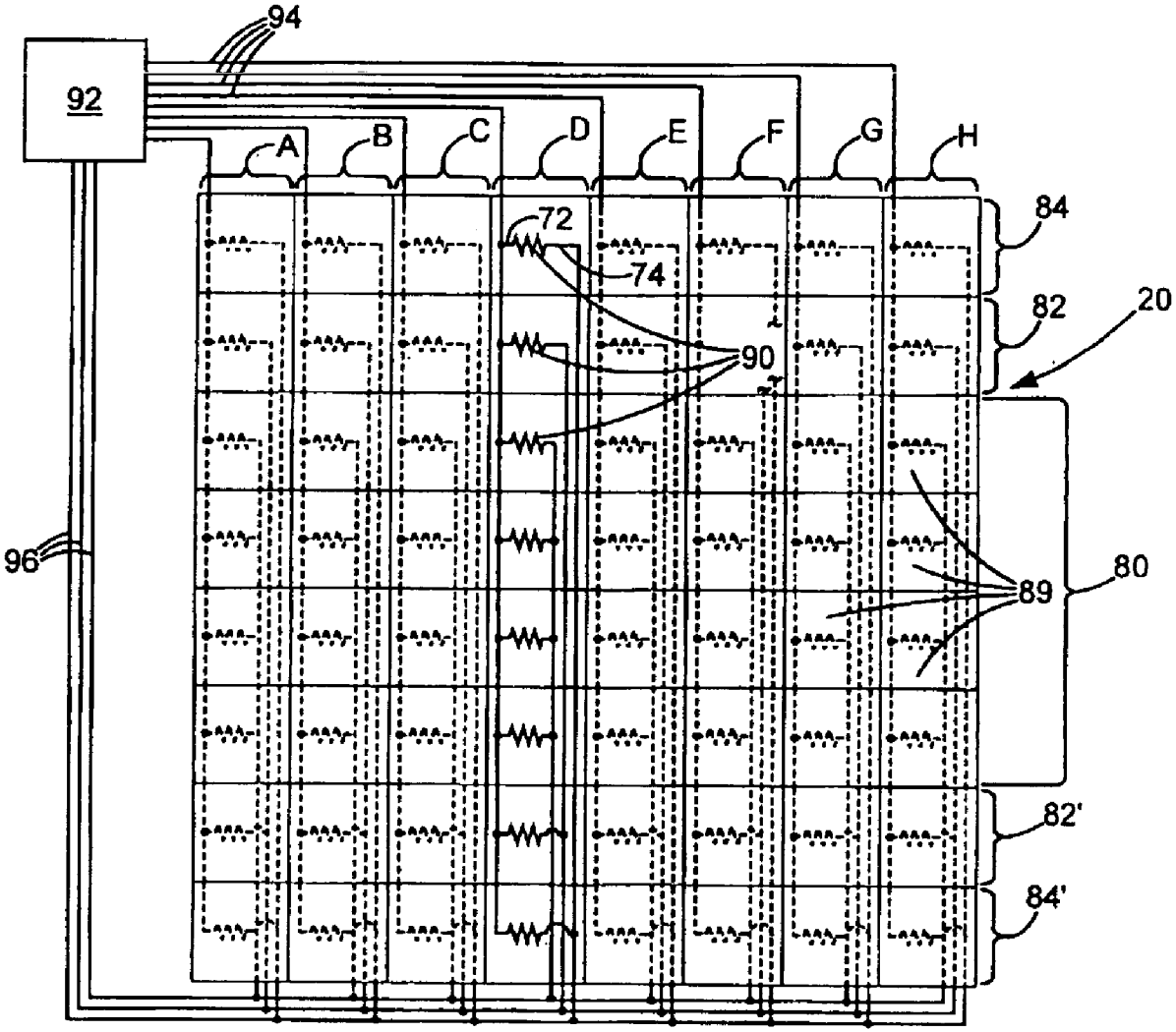
FIG. 5 is a simplified schematic plan view of the platen of FIG. 1.

As shown schematically in FIG. 5, the platen 20 is divided into rows 80, 82, 82', 84, 84' and columns A–H. In an alternative embodiment there may be many more columns and rows, with each valve element separately addressed. In the preferred embodiments, the rows and columns define a matrix of sectors 89, each of which may be identified by its row and column (e.g. 84A, 82'F.) Some of the sectors (such as those in rows 82, 84, 82', 84') are wired separately, while those in row 80 are ganged together in parallel in each column. Each sector in the preferred embodiment includes several valve elements, with the resistors of each sector wired in parallel, and together indicated by a resistor group symbol 90. Each resistor group has a common number of resistors, preferably about 10. Increasing the number of resistors and valve elements per sector reduces the number of control lines, but increases the open space not covered by a typical media sheet, on average.

A controller circuit 92 has a ground line 94 connected to each column, connecting to the conductor 72 of each resistor in each block of that column. Each row is connected by one of several row-addressing power lines 96. For symmetrical operation with reduced connections, rows 82 and 82' connect to a common line, as do rows 84 and 84'. The several blocks of the wider central row 80 connect to a single power line. The central block has a width established for the narrowest media that can be used on the platen. Any number and size of outer rows may be employed to improve resolution, and to accommodate a wider range of media widths.

The circuit may address each sector individually in a multiplexed operation in which each column (or row) is sequentially activated by switching the ground line to ground, and simultaneously setting the power lines to the activate the appropriate blocks for that column. By rapidly sequencing through the columns, a power pulse adequate to maintain heat for keeping valves open is delivered. However, in the preferred embodiment, a simpler system may be used, since the only open regions will be a rectangular central region that may or may not extend off either end. Thus, the circuit need only disable the rows that extend beyond the media width, and the columns in advance of the media leading edge, and behind the media trailing edge. This permits constant unpulsed lower currents adequate to maintain valve opening heat without electromagnetic noise from switching much high currents.

The system operates by the user setting the paper guide to a suitable width, which communicates with the control circuitry. Peripheral rows entirely beyond this width are disabled by preventing current flow from heating the resistors and opening the valves. This is done by preventing voltages from being applied on the associated power lines.

Initially, all sectors are closed. Other sensors detect the position of the leading edge, and infer the position of the leading edge as feeding proceeds during printing by monitoring the motion and position of a belt roller or other element linked to the feed mechanism progress. In advance of the leading edge encountering each new sector, the control circuit opens the valves in the enabled rows of each column by grounding the associated ground line.

For printing multiple sheets in a single job, the sheets may be fed with the leading edge of each subsequent sheet following near the trailing edge of prior sheet, so that columns need not be disabled between sheets. As the final sheet in a job is printed, the ground line of each column is disabled to allow the flaps to close, after the trailing edge of the sheet fully departs the column.

While the above is discussed in terms of preferred and alternative embodiments, the invention is not intended to be so limited.

What is claimed is:

1. A printer with a media transport comprising:

a rigid, air-transmissive platen;

a movable air-transmissive flexible web coextensive with the platen;

a suction device in communication with the platen to draw air through the web and through the platen such that a sheet of media carried on the web is biased toward the platen; and a valve sheet overlaying the platen, the valve sheet including a plurality of shut-off elements, each movable in response to temperature changes between a closed position in which the element contacts a portion of the platen to prevent air flow through that portion of the platen, and an open position, in which the element is spaced apart from the platen to admit air to the platen portion.

2. The printer of claim 1 wherein each valve element includes a bimetallic strip.

3. The printer of claim 1 wherein each platen portion defines an aperture communicating with the suction device.

4. The printer of claim 1 including an electrical connection to each of the shut-off elements, such that electrical power may be applied to heat an element to generate the temperature change needed for moving the element to the open position.

5. The printer of claim 1 wherein the web overlays the valve sheet.

6. The printer of claim 1 wherein each valve element is provided by an aperture in the sheet, with an arm protruding into the aperture.

7. The printer of claim 6 wherein each arm is elevated above a plane defined by the sheet when in an open position, and is flush with the plane when in the closed position.

8. The printer of claim 6 wherein the arms extend in a common direction.

9. The printer of claim 8 wherein the web operates to move a media sheet in the common direction.

10. The printer of claim 1 including a controller connected to the valve sheet and operable to determine the position of the sheet of media on the web, and to set at least some of the valve elements overlaid by the sheet to the open position, and to set at least some of the valve elements away from the sheet to the closed position.

11. A vacuum hold-down device comprising:

a flat platen having an upper surface and a lower surface;

the platen defining an array of aperture each extending through the platen from the upper surface to the lower surface;

a suction device in communication with the platen to draw air through the apertures; and a valve sheet coextensive with the platen, the valve sheet including a plurality of movable shut-off elements each having a movable element registered with a respective aperture and movable in response to temperature changes between a closed position in which the element contacts a portion of the platen to prevent air flow through the aperture associated with that portion of the platen, and an open position, in which the element is spaced apart from the platen to admit air to the aperture associated with the portion of the platen.

12. The hold down device of claim 11 wherein each of the valve elements includes a thermally sensitive element that responds to a change in temperature to determine its position.

13. The hold down device of claim 11 wherein each valve element includes a bimetallic strip.

14. The hold down device of claim 11 wherein each valve element includes a resistive heater.

15. The hold down device of claim 11 including an electrical connection to each of the shut-off elements, such that electrical power may be applied to heat an element to generate the temperature change needed for moving the element to the open position.

16. The hold down device of claim 11 including a movable air-transmissive web operable to carry a sheet of media over the platen.

17. The hold down device of claim 11 wherein each valve element is provided by an aperture in the sheet, with an arm protruding into the aperture.

18. The hold down device of claim 11 including a controller connected to the valve sheet and operable to determine the position of a sheet of media on the web, and to set at least some of the valve elements overlaid by the media sheet to the open position, and to set at least some of the valve elements away from the media sheet to a closed position.

19. A method of operating a printer having a vacuum platen defining an array of apertures communicating with a vacuum device, and having a valve sheet coextensive with the platen and including a corresponding array of thermally responsive valve elements, comprising:

providing a media sheet:

passing the media sheet over the platen;

while passing the media sheet, setting at least some of the valve elements overlaid by the media sheet to [obscure] *maintain open* the corresponding aperture, and setting at least some of the valve elements away from the media sheet to [maintain open] *obscure* the corresponding aperture.

20. The method of claim 19 including opening valve elements as the leading edge of the media sheet approaches, and closing valve elements as the trailing edge of the media sheet passes.

* * * * *